Jan. 14, 1969     T. L. OBERLE ET AL     3,421,201

TURBOCHARGERS

Filed Dec. 3, 1964

INVENTORS
THEODORE L. OBERLE
MARION R. CALTON

BY Fryer and Tjensvold

ATTORNEYS

United States Patent Office 3,421,201
Patented Jan. 14, 1969

3,421,201
TURBOCHARGERS
Theodore L. Oberle, Washington, and Marion R. Calton, East Peoria, Ill., assignors to Caterpillar Tractor Co., Peoria, Ill., a corporation of California
Filed Dec. 3, 1964, Ser. No. 415,724
U.S. Cl. 29—470.3        2 Claims
Int. Cl. B23k 27/00; B23k 35/24

ABSTRACT OF THE DISCLOSURE

The speed of relative motion at the interface is limited and the total energy is restricted to minimize the precipitation of intermetallic compounds at the interface of two friction bonded parts. The bond zone is also worked plastically at low speeds to break up any compound that does precipitate so that the bond formed is free of films of the intermetallic compound.

---

This invention relates to a method of bonding metallic parts which can precipitate a hard, brittle, intermetallic compound in the bond zone under conditions of normal heating and subsequent cooling occurring during the bonding process. The present invention has particular application to a process for bonding a high temperature-resistant superalloy turbocharger wheel to a carbon steel shaft by rotating end surfaces of the wheel and shaft in rubbing contact at speeds low enough and under conditions of plastic working severe enough to prevent the formation of a carbide film in the bond zone.

As a result of the publication of Russian articles on friction welding, a great deal of work is now being done on methods of bonding metal parts by engaging ends of the parts in rotational rubbing contact to heat the engaged ends to a condition where the parts can be bonded together. Mechanical energy used to produce relative rotation and rubbing contact of the parts is thus converted to heat at the interface between the parts.

Our copending U.S. application Ser. No. 407,955, filed Oct. 27, 1964, now U.S. Patent No. 3,273,233, relates to a bonding method of this general kind and discloses ways for closely controlling the energy input to the interface. The present invention also relates to a bonding method of this general kind and is specifically directed toward a precisely controlled, low speed process for bonding hard-to-weld materials.

Many metallic parts are easy to weld. With such parts large differences in the total energy input and the rates of energy input are generally not critical. For example, many carbon steels can be heated considerably beyond the minimum amount needed to form a bond and still produce an acceptable bond. Thus, while the bond resulting from overheating is not optimum, the bond will often have sufficient strength for the intended use.

Many other metallic materials are not so readily weldable. When bonding such materials, it becomes much more important to restrict the total energy input much more closely to the minimum amount neded to form the bond. This is particularly the case when one of the parts to be bonded comprises material which can precipitate a hard, brittle, intermetallic compound in the bond zone under the inherent conditions of heating and subsequent cooling. The hard, brittle, intermetallic compound taken into solution by the heat generated during the bonding process and precipitated on cooling can form a film at or near the interface. This film is spread out as a plane of weakness by the relative rotation of the parts and reduces the strength of the bond. The film can be extensive enough to produce cracks in the bond zone.

Materials which contain sufficient carbon and carbide forming elements to precipitate carbides are subject to this problem of the formation of brittle, intermetallic films in the bond zone. The forming of precipitated films of such hard, brittle, intermetallic compounds is also a problem in bonding aluminum to steel and titanium to steel. The problem of such brittle films producing a plane of weakness becomes particularly acute in the bonding of cobalt base and nickel base high temperature resistant superalloys to carbon steel parts.

It is a primary object of the present invention to minimize the amount of such hard, brittle, intermetallic compounds precipitated. It is a related object to work the bond zone plastically at low speeds as the bond is formed to shatter and to disperse any such compound that does precipitate. In this manner the process of the present invention produces a bond which is free from films of the hard, brittle, intermetallic compounds.

In a preferred form of the present invention the total energy needed to form the bond is stored in a rotating flywheel associated with one of the parts. The parts are then engaged in rubbing contact to convert the stored energy to heat at the interface as the speed of the flywheel decreases. The amount of energy stored in the flywheel is restricted to prevent overheating and to thereby prevent precipitation of large amounts of the intermetallic compounds. A large flywheel is used at low initial speed to further minimize the heat generated at the interface. This also makes a large part of the stored energy available for low speed plastic working which shatters and disperses any compounds that do precipitate.

Other and further objects of the present invention will be apparent from the following description and claims and are illustrated in the accompanying drawing which, by way of illustration, show preferred embodiments of the present invention and the principles thereof and what are now considered to be the best modes contemplated for applying these principles. Other embodiments of the invention embodying the same or equivalent principles may be used and structural changes may be made as desired by those skilled in the art without departing from the present invention and the purview of the appended claims.

In the drawing:
FIG. 1 is an elevation view, partly broken away to show details of the bond zone, of a high temperature resistant superalloy turbine wheel bonded to a carbon steel shaft in accordance with the present invention;

Figure 4:
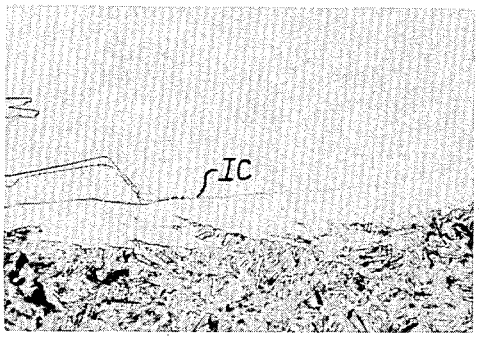
FIG. 4 is a photomicrograph, enlarged five hundred times, of an etched cross section of a high temperature resistant nickel base 713C alloy bonded to a carbon steel at too high a speed (about 800 intial surface feet per minute at the interface) and shows the carbide film which is precipitated and spread out as a plane of weakness near the weld interface under such conditions.
Figure 5:
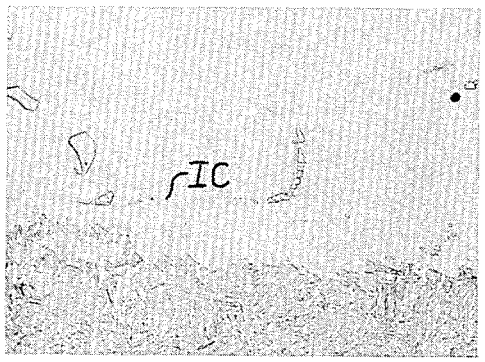
Figure 6:
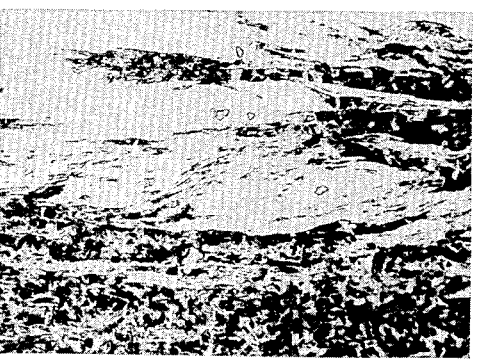

FIG. 5 is a photomicrograph like FIG. 4 illustrating a substantial reduction in carbide formation when the initial speed of relative rotation is reduced to about 400 surface feet per minute at the interface; and FIG. 6 is a photomicrograph like FIGS. 4 and 5 illustrating the intimate mixing and complete breakup of any carbide precipitates when the parts are engaged at an initial surface velocity of about 265 surface feet per minute at the interface.

Figure 1:
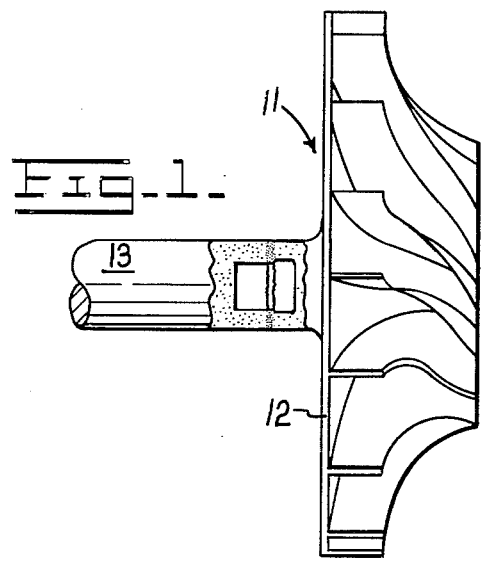

In FIG. 1 a turbocharger wheel and shaft assembly bonded in accordance with the present invention is indicated generally by the reference numeral 11. The turbocharger wheel 12 is exposed to hot, corrosive engine exhaust gases. The wheel must be made from a high temperature resistant superalloy. It is preferable that the shaft 13 be a tough carbon steel shaft for strength and wear qualities as well as for economic reasons. The shaft 13 drives a compressor wheel, not shown, which is mounted on the end of the shaft opposite the turbocharger wheel 12.

Prior to the present invention the turbocharger wheel was generally joined to the shaft by silver brazing, The brazing process was not a completely satisfactory method of joining the two parts. The bond produced by brazing did not have the full strength of either of the parts, the reject percentage was too high, and the cost of silver brazing was high.

The direct connection of these two parts by solid state bond by the method described below provides a stronger connection than can be obtained through silver brazing, reduces the reject percentage as compared to brazing and reduces the cost of manufacture.

Superalloy materials such as cobalt base Stellite 31 and nickel base 713C and GMR235 are materials generally used for the turbocharger wheel 12. The carbon steels used for the shaft 13 and the superalloys used for the turbocharger wheel 12 contain sufficient carbon and carbide forming elements to precipitate hard, brittle carbides in the bond zone when the engaged ends of the wheel and the shaft are rotated in rubbing contact at the interface at initial speeds (approximately 800–1000 feet per minute initial surface velocities at the interface) which can be used quite satisfactorily for inertial bonding steel to steel. The hard, brittle carbides thus formed are spread in a film by the rotation developed during the bonding process.

This film of intermetallic compounds (in this case carbides) is indicated by the reference characters IC in FIG. 4. This film IC shown in FIG. 4 was produced between a nickel base 713C turbocharger wheel (the lighter areas of the photomicrograph) and a carbon steel shaft (darker areas of the photomicrograph) in the course of a bonding process in which the total energy for forming the bond was stored in a flywheel associated with one of the parts and the parts were engaged with an initial surface velocity of about 800 surface feet per minute. This photomicrograph indicates quite clearly that the carbides were precipitated and spread out as a plane of weakness near the weld interface at the relatively slow speed (about 1800 r.p.m. initial velocity for the part sizes here involved) used for bonding these parts.

FIG. 5 illustrates the results of decreasing the speed from about the 800 surface feet per minute used in FIG. 4 to about 400 surface feet per minute for the parts shown in FIG. 5. The flywheel mass was increased to maintain the same energy input. This reduction in speed produces a substantial reduction in carbide formation.

When the speed is reduced to about 265 surface feet per minute, the carbide film is completely eliminated. FIG. 6 shows the bond zone when the parts are bonded at this initial surface velocity. The flywheel mass was again increased to maintain the same energy input as was used for the bonds shown in FIGS. 4 and 5.

It is believed that the higher speeds produce higher temperatures, which allow more carbides to be taken into solution and precipitated out in the weld interface on cooling. It is also believed that lower speeds hold down the maximum temperature by inducing earlier welding and subsequent plastic working of a considerable amount of material in the bond zone. FIG. 6 indicates that if any carbides are produced at the lowest speeds, the gross working at the lower speed shatters and disperses the carbide into particles too small to be seen and too unoriented to produce any sort of a plane of weakness in the weld zone. The bond produced under the speed conditions described in reference to FIG. 6 is at least as strong as the weaker of the two materials being bonded.

As noted above, the inertial process is preferred for forming the bond between the wheel and shaft. The total energy to be put into the bond can be precisely controlled by bringing the flywheel up to the desired speed and then expending the entire energy of the flywheel as the parts are rotated in rubbing contact at the interface. The use of the flywheel not only facilitates accurate control of the energy input, it also makes it feasible to use very low speeds. Low speeds, as pointed out above, are a definite factor in reducing the amount of intermetallic compounds which are precipitated. The desired amount of energy can be obtained at low speeds by using a large flywheel. The use of a large flywheel is in turn a distinct benefit because the large flywheel makes a large part of the stored energy available for low speed plastic working both as the bond forms and after the bond has formed. This plastic working shatters and disperses any intermetallic compounds that do precipitate.

Figure 2:
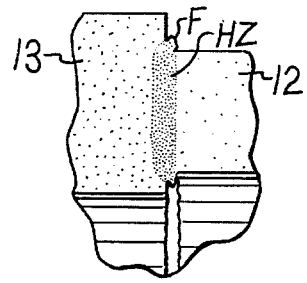
FIG. 2 is a fragmentary enlarged view of a part of the bond zone of the turbocharger wheel and shaft assembly shown on FIG. 1.

Proper joint design is another factor which should be considered when parts like those described above are to be joined together. When hard-to-weld materials are to be joined, problems of cracking can be minimized if the ends to be joined can be formed to a tubular configuration rather than bonded as solid bars. Because of the greater differences in speed across the face of a solid bar, bars are harder to weld than tubes.

Where there is a substantial difference in the strength of the parts to be joined, the lower strength part should have a larger end face than the higher strength part to prevent excessive flashing away of the lower strength part. Thus, as illustrated in FIG. 2, to prevent excessive flash F from being ejected from the heat affected zone HZ, the inside diameter of the shaft should be about $\frac{1}{16}$ inch less than the inside diameter of the tubular part of the turbocharger wheel and the outside diameter of the shaft should be about $\frac{1}{16}$ inch greater than the outside diameter of the tubular portion of the turbocharger wheel. The carbon steel part should have a larger base to support the material heated to a plastic state.

Figure 3:
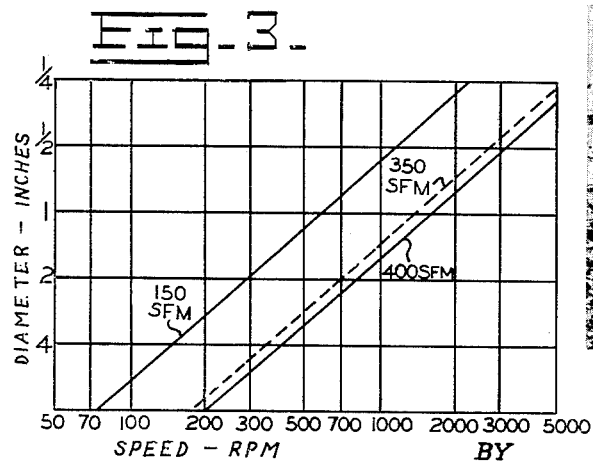
FIG. 3 is a chart showing the minimum and maximum speeds for bonding superalloys like the turbocharger wheel shown in FIG. 1 to carbon steels like the shaft shown in FIG. 1.

The speed ranges for bonding a steel part to a superalloy part are shown in chart form in FIG. 3. For a nickel base 713C alloy the initial surface velocity at the interface should be within the speed range of 150 surface feet per minute to 400 surface feet per minute to produce a satisfactory weld free of films of precipitated carbides.

With Stellite 31 material the upper speed limit is more critical. With this material the range of initial surface speeds at the interface should be between 150 surface feet per minute and 350 surface feet per minute to produce the desired intermixing and freedom from films of precipitated carbides.

The welding of unheat treated carbon steel to superalloys is most successfully accomplished by use of relative velocities within the upper portion of the speed range shown in FIG. 3. The welding of heat treated steel to superalloys requires that the velocities be within the lower portion of the specified ranges for the specific materials involved.

By way of specific example, it has been found that welding of a tubular member of Stellite 31 (HS31) having an outside diameter of 0.94 inch and an inside diameter of 0.56 inch to a tubular carbon steel member having an outside diameter of 1.0625 inches and an inside diameter of 0.50 inch is best accomplished by the use of the following parameters:

Speed—615 to 1426 r.p.m. (150 to 350 s.f./min.)
Minimum flywheel mass—150 to 35 lbs.-ft.$^2$
Minimum pressure—20,000 to 35,000 p.s.i.

Tests have also indicated that a tubular nickel base 713C alloy part having an outside diameter of 0.94 inch and an inside diameter of 0.56 inch may be successfully bonded to a carbon steel part having an outside diameter of 1.065 inches and an inside diameter of 0.50 inch by use of the following parameters:

Speed—615 to 1630 r.p.m. (150 to 400 s.f./min.)
Minimum flywheel mass—150 to 30 lbs.-ft.$^2$
Minimum pressure—20,000 to 35,000 p.s.i.

While we have illustrated and described the preferred embodiments of our invention, it is to be understood that these are capable of variation and modification, and we therefore do not wish to be limited to the precise details set forth, but desire to avail ourselves of such changes and alterations as fall within the purview of the following claims.

We claim:

1. A method of bonding metallic parts across a common interface wherein a carbon steel part is bonded to a high temperature resistant super alloy part containing significant amounts of carbide forming alloys which can precipitate a hard, brittle, intermetallic compound in the bond zone under conditions of sufficient heating, said method comprising, storing the total energy needed to form the bond in a rotating flywheel connected to a part, engaging ends of the parts in rotational rubbing contact under pressure to heat the interface to a bondable temperature while converting the stored energy to heat at the interface as the speed of the flywheel decreases, restricting the total energy put into the interface and using a large flywheel at low initial speed to minimize heating to a condition in which substantial amounts of the compound can precipitate and to make a large portion of the stored energy available for low speed plastic working which shatters and disperses any compounds that do precipitate, and wherein the size of the flywheel is selected to produce an initial speed of relative rotation at the outside surface of the interface within the range of 150 to 400 feet per minute, whereby the bond formed is free of films of the hard, brittle, intermetallic compound.

2. A method of bonding metallic parts across a common interface wherein a carbon steel part is bonded to a cobalt base Stellite 31 part which can precipitate a hard, brittle, intermetallic compound in the bond zone under conditions of sufficient heating, said method comprising, storing the total energy needed to form the bond in a rotating flywheel connected to a part, engaging ends of the parts in rotational rubbing contact under pressure to heat the interface to a bondable temperature while converting the stored energy to heat at the interface as the speed of the flywheel decreases, restricting the total energy put into the interface and limiting the speed of relative motion at the interface by using a large flywheel at low initial speed to minimize heating to a condition in which substantial amounts of the compound can precipitate and to make a large portion of the stored energy available for low speed plastic working which shatters and disperses any compounds that do precipitate, and wherein the size of the flywheel is selected to produce an initial speed of relative rotation at the outside surface of the interface within the range of 150 to 350 feet per minute, whereby the bond formed is free of films of the hard, brittle, intermetallic compound.

References Cited
UNITED STATES PATENTS 3,273,233   9/1966   Oberle et al. _____ 29—480 X JOHN F. CAMPBELL, *Primary Examiner.*

U.S. Cl. X.R.
29—480, 504